United States Patent [19]

Emond

[11] 4,028,120

[45] June 7, 1977

[54] MOLD RELEASE AGENT FOR URETHANE FOAMED RUBBER

[75] Inventor: Robert Earl Emond, Mooretown, Canada

[73] Assignee: Exxon Research and Engineering Company, Linden, N.J.

[22] Filed: Dec. 20, 1974

[21] Appl. No.: 534,858

[52] U.S. Cl. .................. 106/38.24; 106/38.25; 106/268; 106/271; 264/338; 427/135
[51] Int. Cl.² .................................... B28B 7/38
[58] Field of Search ............ 106/38.24, 38.7, 243, 106/268, 270, 271, 38.25; 427/135; 264/338; 164/33

[56] References Cited

UNITED STATES PATENTS

| | | | |
|---|---|---|---|
| 2,901,361 | 8/1959 | Meisel | 106/38.23 |
| 2,976,160 | 3/1961 | Fronczak et al. | 160/38.24 |
| 2,993,800 | 7/1961 | Pickell | 106/271 |

*Primary Examiner*—Lorenzo B. Hayes
*Attorney, Agent, or Firm*—Wayne Hoover

[57] ABSTRACT

A mold release agent for foamed rubber formulated from the sodium soap of tall oil acids, kerosene and paraffin wax has improved mold release properties. This mold release agent is effectively removed from the molded articles by water washing, thus eliminating the need of hydrocarbon solvents. A preferred method of manufacture of the mold release agent is also described combining the tall oil and a paraffin base oil and heating to 125° F., neutralizing with aqueous alkaline solution dehydrating and heating to 315° F., adding 25% more paraffin base, cooling while stirring, adding wax at 245° F. and finally adding kerosene when mixture has cooled to 130° F., to provide an improved mold release agent.

6 Claims, No Drawings

MOLD RELEASE AGENT FOR URETHANE FOAMED RUBBER

BACKGROUND OF THE INVENTION

This invention relates to a method of preparing improved mold release agents for foamed rubber manufacture; more particularly the invention describes the use of said improved mold release agents in the manufacture of urethane foamed rubber products.

The industry has expended considerable time and efforts in trying to develop materials to facilitate the release of molded resins from the mold. In general, each molding composition requires a special release material or agent and many times, a different release agent is required with the various foams. In many cases, hydrocarbon waxes in the foams of low melting solids, dispersions or solutions which are applied to the mold surfaces by wiping or spraying have proved quite satisfactory if the wax is sufficiently insoluble in the molding or casting composition that the formed article would not adhere well to the wax surface. In the manufacture of automotive crash pads which are fabricated from two components, a foamed rubber core and a vinyl plastic outer skin, it has been found that the foam adheres tenaciously to the metal mold and a mold release agent is applied around the edges and openings in the covering to prevent the foam from sticking to its outside surface during fabrication. About ¼ lb. of mold release agent is also applied to the metal mold, usually during the manufacturing process for each of the crash pads. It is applied onto the form prior to adding the liquid resin mix. During the curing period, the foamed rubber expands to fill the required space between the vinyl and the metal form. The completed crash pad is then withdrawn from the mold and the release agent is removed by means of a solvent from the outer vinyl skin. This operation is generally done by hand. In the prior art, workers have employed as a mold release agent a 50—50 Estan/Varol composition, but Varsol is now precluded because of safety reasons. Other workers have found that Fluorine containing silane derivatives are useful as mold release agents. However the cost of these times limits their use in the manufacture of automotive crash pads. Silicones have also been found to be good release agents, but unfortunately stain the vinyl skin covering. Another prior art worker has employed an estersil gel base in an evaporable vehicle. This is sprayed or painted on the mold; but, such a vehicle requires the use of hydrocarbon solvents. It is therefore an object of this invention to define a mold release agent which will permit the efficient removal of the finished product from the mold and at the same time would be water soluble to allow the removal of the mold release agent from the molded product by spraying or washing. It is another object of this invention to provide a method of manufacturing these improved mold release agents. These and other objects will become evident from the following description and discussions of the preferred embodiments.

SUMMARY OF THE INVENTION

In accordance with the present invention, mold release agents for applying to the surfaces of a mold comprising a composition containing from about 3 to about 25 wt. % of the sodium soap of tall oil acids in admixture with from about 12 to about 38 wt. % kerosene and from about 3.5 to about 5 wt. % paraffin waxes are provided. In another embodiment, an improved process for preparing automobile crash pads including the steps of molding urethane foam pad to a vinyl outer covering wherein the improvement comprises applying to the mold's internal surfaces a mold release agent comprising the sodium soap of tall oil acids as provided herein to effectively coat said mold's internal surface and, thereby preventing the adherence of said urethane foam to said mold.

One of the ingredients of the mold release agent as described above is a tall oil acid. Tall oil is the common name for the major by-product of the kraft or sulfate pulping process. It is obtained by the acidification of the rosin and fatty acid sodium soaps recovered from the concentrated black liquor in the kraft or sulfate pulping process. In the sulfate or kraft process, chipped pinewood is digested with a solution of sodium sulfide, sodium hydroxide and sodium carbonate. The digestion proceeds under high temperature and pressure in a digestor. After a multi-step process wherein the soaps are concentrated, the soap is removed by means of a mechanically operated sweep. The soap skimmings contain approximately 55% resin and fatty acids as sodium salts, 35% water and 10% black liquor solids. The main components of crude tall oil are fatty acids, rosin acids and unsaponifiables. A typical composition of some crude tall oils may be found in Table I below:

TABLE I

COMPOSITION OF SOME CRUDE TALL OILS

| Pine Tree Source | Fatty acids, % | Rosin acids, % | Neutral fraction, % |
| --- | --- | --- | --- |
| Swedish | 40–58 | 30–50 | 6–15 |
| Finnish | 37–59 | 32–49 | 6.8–11.3 |
| Finnish (whole trees) | 29–36 | 52–57 | 9–11 |
| Finish (sawmill waste) | 49–62 | 30–39 | 5–12 |
| Danish | 50 | 43 | 6.7 |
| American | 18–53 | 35–65 | 8–24 |
| Canadian mixed sample | 46 | 28 | 25 |
| S.E. Virginian | 55–56 | 39–40 | 4.8–5.8 |
| N.E. North Carolinan | 53–54 | 40–41 | 5.3–6.1 |
| S.W. North Carolinan | 51–53 | 41–42 | 6.1–6.9 |
| E. Central S. Carolinan | 46–48 | 45–47 | 6.2–7.4 |
| E. Central Georgian | 45–48 | 45–48 | 6.2–7.4 |
| S.E. Georgian | 43–46 | 47–51 | 6.3–7.4 |
| S.E. Texan | 45–48 | 46–48 | 5.3–7.1 |

The crude tall oil, produced as per the above described process, is thereafter refined by fractional distillation to yield a production of tall oil fatty acids. These acids are commercially available in a variety of grades which vary in color, color stability, content of rosin acids and unsaponifiable material. The tall oil fatty acid employed in the mold release formulation agent of the present invention is a tall oil fatty acid having an amber color, with a 130–140 iodine number. However, any tall oil fatty acid may be employed.

Among the other reactants used in the formulation of the mold release agents is aqueous sodium hydroxide, and other hydroxide such as potassium hydroxide. However, sodium hydroxide is the preferred reactant.

Another component of the mold release agent is a paraffin base oil which typically is a paraffin distillate dewaxed and hydrofinished. This paraffin base oil may be selected from paraffin hydrocarbon materials having a carbon chain length of from 4 to 15 carbons; additionally, unsaturated aliphatic hydrocarbons having from 4 to 10 carbon atoms. Preferred as the paraffin base are oils having an API gravity of 27, viscosity at 100° F., and at 210° F. of 300 and 50 SUS respectively.

A non-viscous mineral oil as described is preferred as a vehicle since it fulfills the following important criteria:

a. The oil film adhering to the metal mold readily evaporates during processing;

b. a mold release composition made with such an oil may be easily removed with water from the metal mold; and c. such an oil functions as a suitable base in the manufacture of mold release compositions.

Another component of the mold release agent is a paraffin wax which may be described as a refined 125°/127° F. melting point wax containing 60% normal paraffins and a needle penetration of 14 mm/10 at 77° F. as per ASTM method D-1321.

A final component of the formulation is a kerosene, which is usually employed in amounts from about 12 to about 38 wt. %, preferably from about 22 to about 28 wt. %. Typically, the amounts of tall oil and sodium hydroxide or aqueous alkaline solution employed to form the sodium tallate soap which is used, in the formulation of the mold release agents will be in the range of from about 10 to about 25 wt. % for the tall oil preferably from about 15 to about 20 wt. % and about 3 to about 8 wt. % preferably from about 4.5 to about 6.1 wt. % of the aqueous alkaline material. The amount of paraffin wax employed in the formulation of the mold release agent will be in the range of from about 3.5 to about 5 wt. % preferably from about 2.5 to about 8 wt. %, based on the total formulation.

The present invention also describes an improved process for the preparation of automobile crash pads which includes a step of molding a urethane foam pad to a vinyl outer covering, the improvement comprises applying to the mold's internal surface a mold release agent containing the sodium soap of tall oil acids as defined above to effectively coat said mold's internal surface, thereby preventing the adherence of said urethane foam to said mold.

Automotive crash pads are made by molding urethane foam pads to the back of a vinyl outer covering. The mold contains two metal forms, an upper detachable section and a lower form fixed to a moveable metal frame. As the iron molds move along the assembly line into the bottom form and a middle frame is clamped in position within the cavity of the vinyl. The mold release agent is brushed onto the metal as well as on the selected parts of the vinyl covering and edges of the metal frame. This prevents the urethane from adhering to these points. Further along the assembly line, a predetermined amount of liquid resin mixture is added to an opening in the frame, a plastic sheet is folded over the opening in the frame, a plastic sheet is folded over the opening and the upper mold is pressed into position on the crash pad assembly. A polyurethane is allowed to foam and set while it then continues through a kiln (heated to about 140° F.) for an interval of ten (10) minutes. At the end of the line, the crash pad is removed. The pads are cleaned, using a solvent to remove the residues of the mold release agent. Prior to this invention, the solvents normally used would have included Varsol or trichloroethylene, the former being a fire hazard and the latter causing skin irritation. Hence, by using the mold release agent compositions as provided by the present invention the following advantages are obtained:

a. The use of solvents which may be irritating to the skin or flammable is eliminated and b. the mold release agents are readily removed from the metal mold by spraying and/or washing with warm water.

DESCRIPTION OF THE PREFERRED EMBODIMENTS

The invention will be further understood by reference to the following examples, which are not, however, intended to limit the invention in any way.

EXAMPLE 1

The procedure of this example was as follows:

a. The required amount of tall oil is added into a mixer.

b. About ¾ of the amount of paraffin base oil is blended with the tall oil and heated to 125° F.

c. An aqueous solution of sodium hydroxide (50 Beaume lye) is added until the reaction product so formed produces an excess alkali of about 0.4% when titrated with a dilute solution (0.1 normal) of hydrochloric acid.

d. The product is dehydrated by increasing the temperature above 220° F.

e. After dehydration, the remaining oil is added to the extent that a required consistency is reached, (i.e., 290 mm/10 at 77° F. measured by plastic cone).

f. The product is cooled and wax is added at a temperature of 245° F.

g. At a temperature below 130° F., the kerosene is added.

h. Finally, the consistency of the mold release agent (as measured by the plastic cone penetrometer) is adjusted by regulating the amount of kerosene added.

EXAMPLE 2

In this example, a number of mold release agent compositions were evaluated for the mold release ability and the ease with which the compositions were removed from the vinyl. The method of evaluation employed was as follows: a piece of vinyl plastic (6 inches diameter) was coated with a layered product of a thickness of approx. 1 millimeter. The urethane foam is prepared by mixing the resin and isocyanate at a ratio of 3:1. The foam was quickly spread over the area previously coated with release agent and the plastic and foam were placed in an oven at 140° F. for 10 minutes. At the end of this period, the expanded foam and vinyl were removed. After cooling, the vinyl is peeled from the foam layer, inspected for any adhesion between the foam and vinyl, and rated. The vinyl was thereafter washed under a water spray from a DeVilbiss nozzle (size ½ GG) with water at a pressure of 18 psi at 70° F. The vinyl was held under the spray at a distnace of 1 foot from the nozzle for one minute, and ratings were made according to the amount of compound removed. The results of this evaluation may be found in Table II.

EXAMPLE 3

The following procedure was used in obtaining the data found summarized in Table III under the heading "Mold Release Rating". A piece of vinyl plastic (6 inches diameter) is coated with a layer of product to a thickness of approximately 1 millimeter. The urethane foam is prepared by mixing the resin and isocyanate at a ratio of 3:1. It is quickly spread over the area previously coated with release agent and the plastic and foam are placed in the oven at 140° F. for 10 minutes. At the end of this period, the expanded foam and vinyl are removed. After cooling, the vinyl is peeled from the foam layer, inspected for any adhesion between foam and vinyl and rated. The rating scale used is defined as follows:

Fair-Poor implies foam and metal adhere to one another.

Good implies that foam and metal mold could be separated, thus denoting the effectiveness of mold release compound.

Excellent implies little or no adhesion between mold and foam.

The procedure in obtaining the data found in Table II under the heading "Removal of Release Agent", is as follows:

The piece of vinyl removed from the above-described test is placed under a water spray from a DeVilbiss nozzle (size ½ GG). The water is adjusted to a pressure of 18 psi at 70° F. The vinyl is held under the spray at a distance of 1 foot from the nozzle for 1 minute. Ratings were made according to the amount of compound removed.

The results of the evaluation of various metal tallate soaps as mold release agents may be found summarized in Table III.

EXAMPLE 4

The procedure of Example 3 was repeated except for the incorporation of certain amounts of paraffin wax as set forth in Table IV and V, into the mold release agent compositions.

In Table V, the compositions are described which were tested in the manner set forth in Example 3 above and the results of said testing are summarized in Table IV. These results show that the incorporation of 3.8% wax gives improved efficiency of the mold release composition compared with greater amounts of wax. The sample containing 3.8% wax gave excellent ratings 40% of the time while the samples containing 6.0% wax and 10.0% wax did not show excellent ratings. Additionally, with the property of separating the foam from the metal is the efficiency by which the mold release composition may be removed from the crash pads and metal mold.

Samples 3-1, 3-2 and 3-3 were excellent in this respect when compared to the reference "Chem Trend" material now employed in the industry.

It is thus seen that the objects set forth have been attained as it is apparent from the preceeding description and that certainly changes may be made in the above compositions of matter without departing from the spirit and scope of the invention. It is intended that all matter contained in the above description shall be interpreted as illustrative and not in any limiting sense.

TABLE II

EVALUATION OF MOLD RELEASE AGENTS

| Release Agent Composition | Oil Component | Evaluation of Product | |
|---|---|---|---|
| | | Mold Release Rating (1) | Removal from plastic (2) using water |
| 50/50 Blend Estan (3) 2 /Varsol (Ca Soap) | Paraffin 20 Base + Varson 3139 | Excellent | Poor |
| 50/50 Blend Universal Grease (4) /Varsol (Na Soap) | Paraffin 20 Base + Varson 3139 | Good | Poor |
| Baragel (8%)(5) Thickened with Sodium Carbonate | Paraffin 20 Base | Good | Poor |
| Polyethylene (8.5%) Thickened Oil | Paraffin 20 Base | Poor | Poor |

1) Mold Release Rating
   No traces of foam adhering to vinyl - excellent
   Pinpont adhesion of foam to vinyl - good
   Spots more than ¼" in diameter adhering to vinyl - poor
2) Removal of Release Agent Rating
   No traces of grease or oil on vinyl - excellent
   Spots no more than ¼" in diameter showing grease or oil on vinyl - good
   No grease removed by water - poor
3) Eastan 2 - a calcium soap of fleshing grease made with an oil having a viscosity SUS at 100° F. of 300.
4) Universal - a soda soap of fleshing grease made with an oil having a viscosity SUS at 100° F. of 300.
5) Baragel a Hectorite clay used to thicken oils.
6) Polyethylene - Sinclair 2711 - a high density polyethylene softening point 248° F.

TABLE III

METAL TALLATE SOAPS AS MOLD RELEASE AGENTS

| Sample No. | Grease Consistency | Soap Type and Additives (1) | Percent of Composition | Oil Blend | Viscosity of Oil Blend | Evaluation of Product | |
|---|---|---|---|---|---|---|---|
| | | | | | | Mold Release Rating | Removal from Plastic with Water |
| | PLASTIC CONE AT 77° F. | | | | SUS AT 100° F. | | |
| 2-1 | 380 | Potassium Tallate | 13.1 | 58/60 LCT Distillate & Kerosene | 40 | Poor | Good |
| 2-2 | 380 | Sodium Tallate | 14.7 | Paraffin 5 Base (2) + Kerosene | 45 | Good | Good |
| 2-3 | 380 | Sodium Tallate + Zinc Oxide + Methyl Salicylate (3) + Paraffin Wax | 17.3 4.0 0.3 2.0 | Paraffin 20 Base + Kerosene | 60 | Poor Zinc oxide deposited on repeated use | Fair Zinc oxide adheres to foam and plastic |
| 2-4 | 367 | Sodium Tallate + Titanox + Methyl Salicylate (3) + Paraffin Wax | 15.8 1.0 0.3 2.0 | Paraffin 20 Base + Kerosene | 52 | Poor | Poor Titanox adheres to foam and plastic |
| 2-5 | 345 | Sodium Tallate + Paraffin Wax | 16.8 | Paraffin 20 Base + Kerosene | 52 | Fair at Uniroyal plant test Excellent at Goodrich plant test | Excellent Excellent |

(1) Iodine number of tall oil fatty acid = 130 − 140
(2) Paraffin 5-90/95 paraffin distillate phenol treated, dewaxed and hydrofinished
(3) Methyl Salicylate masks kerosene odor.

TABLE IV

EFFECT OF WAX CONTENT ON RELEASE PROPERTIES OF SODIUM TALLATE SOAPS

| Laboratory Designation | Grease Consistency | Composition Ingredient | % | Laboratory Evaluation of Product Mold Release Rating-(percentage of tests) Rated Excellent(1) | Removal From Plastic |
|---|---|---|---|---|---|
| | Plastic Cone at 77° F | | | | |
| 3-1 | 345 | Sodium Tallate | 19.36 | | |
| | | Paraffin 20 Base | 50.24 | | |
| | | Kerosene | 26.6 | | |
| | | Paraffin Wax | 3.8 | 40 | Excellent |
| 3-2 | 332 | Sodium Tallate | 19.6 | | |
| | | Paraffin 20 Base | 47.7 | | |
| | | Kerosene | 26.7 | | |
| | | Paraffin Wax | 6.0 | 0 | Excellent |
| 3-3 | 370 | Sodium Tallate | 16.0 | | |
| | | Paraffin 20 Base | 48.4 | | |
| | | Kerosene | 25.0 | | |
| | | Paraffin Wax | 10.6 | 0 | Excellent |
| Approved Reference "Chem-Trend"(2) | 370 | Sodium major Calcium major Wax in form of a emulsion | | 60 | Poor |

(1)Total of 8 tests on each formulation
(2)"Chem-Trend"-

TABLE V

COMPOSITION OF MOLD RELEASE AGENTS
(Sodium Tallate)

| | A(3-1) | B(3-2) |
|---|---|---|
| Tall Oil (1) | 16.8 | 17.9 |
| Sodium Hydroxide | 2.56 | 2.7 |
| Paraffin 20 Base (2) | 50.24 | 46.7 |
| Kerosene | 26.6 | 26.7 |
| Paraffin Wax (3) | 3.8 | 6.0 |

(1) Tall oil fatty acid, an amber colored liquid with a 130-140 iodine number.
(2) Paraffin 20 Base - a paraffin distillate 52/54 phenol treated dewaxed and hydrofinished having a SUS viscosity at 100° F. of 300-310.
(3) Paraffin wax; $P_2$-125-127 refined paraffin wax.

What is claimed is:

1. A mold release agent for applying to the surfaces of a mold, consisting essentially of from about 3 to about 25% by weight of the sodium soap of tall oil acids in admixture with from about 12 to about 38 wt. % kerosene, from about 3.5 to about 5 wt. % paraffin wax and a paraffin base oil.

2. The mold release agent according to claim 1 wherein said paraffin base oil is a paraffin hydrocarbon material having a chain length of from 4 to 15 carbons.

3. The mold release agent according to claim 1 wherein said paraffin wax comprises a refined 125°/127° F. melting point wax containing 60% normal paraffins.

4. The mold release agent according to claim 3 wherein from about 22 to about 28 wt. % kerosene is employed in the formulation.

5. The mold release agent according to claim 4 wherein the amount of wax employed is about 3.8 wt. %.

6. A mold release agent for applying to the surfaces of a mold, comprising about 19% sodium tallate, about 27% kerosene, about 4% paraffin wax and 50 wt. % paraffin 20 base oil.

* * * * *